US006901946B2

(12) United States Patent
Frazier

(10) Patent No.: US 6,901,946 B2
(45) Date of Patent: Jun. 7, 2005

(54) MODULAR SPILL CONTAINMENT SYSTEM AND METHOD

(75) Inventor: Douglas Frazier, Claremont, CA (US)

(73) Assignee: ExpoPower Systems, Inc., Pomona, CA (US)

( * ) Notice: Subject to any disclaimer, the term of this patent is extended or adjusted under 35 U.S.C. 154(b) by 0 days.

(21) Appl. No.: 10/193,660

(22) Filed: Jul. 9, 2002

(65) Prior Publication Data

US 2003/0066560 A1 Apr. 10, 2003

Related U.S. Application Data

(63) Continuation-in-part of application No. 09/960,759, filed on Sep. 21, 2001, which is a continuation of application No. 09/428,192, filed on Oct. 27, 1999, now Pat. No. 6,308,728.

(51) Int. Cl.⁷ .............................. A47F 1/04; G01M 3/16; H01M 2/02

(52) U.S. Cl. ................. 137/312; 137/15.01; 137/15.11; 137/315.01; 141/86; 211/59.2; 211/184; 220/571; 312/42; 429/48; 429/49

(58) Field of Search .................................. 137/255, 259, 137/260, 312, 315.01, 15.11, 15.01; 141/86, 88; 206/524.1, 524.3, 524.4, 524.6; 211/59.2, 184; 220/571, 573; 222/108; 312/42; 414/276; 429/96, 99, 100

(56) References Cited

U.S. PATENT DOCUMENTS

| | | |
|---|---|---|
| 1,898,297 A | 2/1933 | Fox |
| 2,173,736 A | 9/1939 | Thomas |
| 2,969,863 A | 1/1961 | Woldring et al. .............. 193/35 |
| 3,757,990 A | 9/1973 | Buth .......................... 220/63 R |
| 3,938,666 A | 2/1976 | Castleberry ................... 211/49 |
| 3,952,907 A | 4/1976 | Ogden et al. ................ 137/312 |
| 4,270,661 A | 6/1981 | Rosenband ................... 211/49 |
| 4,552,166 A | 11/1985 | Chadbourne, Sr. et al. ... 137/15 |
| 4,763,796 A | 8/1988 | Flum ......................... 211/59.2 |
| 4,765,775 A | 8/1988 | Kroger ......................... 405/52 |
| 4,790,707 A | 12/1988 | Magretta et al. ............ 414/276 |
| 4,947,888 A | 8/1990 | Tanner ....................... 137/312 |
| 5,090,588 A | 2/1992 | Van Romer et al. ......... 220/573 |
| 5,096,087 A | 3/1992 | Thomas ...................... 220/561 |
| 5,140,744 A | 8/1992 | Miller .......................... 29/730 |
| 5,160,025 A | 11/1992 | Greenawald ................ 206/386 |
| 5,160,051 A | 11/1992 | Bustos ....................... 211/59.2 |
| 5,295,591 A | 3/1994 | Slater ........................ 211/59.2 |
| 5,304,434 A | 4/1994 | Stone .......................... 429/99 |
| 5,316,035 A | 5/1994 | Collins et al. .............. 137/312 |
| 5,316,175 A | 5/1994 | Van Romer ................ 220/573 |
| 5,399,445 A | 3/1995 | Tinker ......................... 429/90 |
| 5,454,195 A | 10/1995 | Hallsten ..................... 52/169.1 |
| 5,464,492 A | 11/1995 | Gregory et al. ............. 156/246 |
| 5,490,600 A | 2/1996 | Bustos ....................... 211/187 |
| 5,492,158 A | 2/1996 | Haag ........................... 141/98 |
| 5,549,178 A | 8/1996 | Yuhas ......................... 184/106 |
| 5,555,907 A | 9/1996 | Philipp ....................... 137/312 |
| 5,593,048 A | 1/1997 | Johnson ..................... 211/59.2 |
| 5,704,476 A | 1/1998 | Abbott ....................... 206/386 |

(Continued)

OTHER PUBLICATIONS

Resume of Bruce H. Dick, 4 pages.
1995 Supplement to the Uniform Fire Code, "Article 64", 1995, 4 pages.

(Continued)

*Primary Examiner*—George L. Walton
(74) *Attorney, Agent, or Firm*—Pillsbury Winthrop LLP

(57) ABSTRACT

A battery spill containment system and method that contain leaks and spills from batteries. The system neutralizes and absorbs leaks and spills to prevent the spills from spreading. The system may have rails that are readily removable to permit access to batteries and to allow more batteries to be stored in a given vertical space. Another system is comprised of modular pans that are connected to each other to form a larger spill containment system.

134 Claims, 13 Drawing Sheets

U.S. PATENT DOCUMENTS

| | | | |
|---|---|---|---|
| 5,722,551 A | 3/1998 | Cocciemiglio, Jr. | 220/4.33 |
| 5,775,869 A | 7/1998 | Bishop | 414/608 |
| 5,865,323 A | 2/1999 | Lecroy | 211/59.2 |
| 5,882,142 A | 3/1999 | Siglin et al. | 405/52 |
| 5,948,250 A | 9/1999 | Middleton | 210/232 |
| 5,975,332 A | 11/1999 | Bishop | 220/571 |
| 6,102,073 A | 8/2000 | Williams | 137/602 |
| 6,308,728 B1 | 10/2001 | Frazier et al. | 137/312 |
| 6,395,417 B1 | 5/2002 | Frazier et al. | 429/49 |

OTHER PUBLICATIONS

ACRAN Products and Services for Back–up Power Industry, "Safeflor", CTL–258, Jan. 15, 1992, 1 page.
ACRAN Products and Services for Back–up Power Industry, "Spill Containment Barrier", CTL–257, Feb. 11, 1992, 1 page.
ACRAN Products and Services for Back–up Power Industry, "Spill Containment Pits," CTL–256, Feb. 12, 1992, 1 page.
ACRAN Products and Services for Back–up Power Industry "Neutra–Mat", CTL–255, Jan. 15, 1992, 1 page.
ACRAN Products and Services for the Backup Power Industry, "Acurack–A Comprehensive Battery Rack System", <undated>, 1 page.
ACRAN "End–to–End Racks", <undated>, 2 pages.
Calicorp, "Aqueous Acid and Battery Electrolyte Spill Containment Products" <undated>, 2 pages.
YUASA–EXIDE, "Yuasa–Exide Spill Containment System–New Product Announcement", <undated>, 4 pages.
Independent Power & Light, "Information on Battery Boxes" <undated>, 3 pages.
Minnesota Pollution Control Agency, "Spent Lead–Acid Batteries–Requirements for Generators", Hazardous Waste Division Fact Sheet #4.06, Jun. 1997, pp. 1–4.
Wisconsin Department of Natural Resources, "Waste Lead Acid Batteries: Management Requirements for Generators and Transporters," PUBL–WA–385, 4/98, pp. 1–5.
Expert Report of Bruce H. Dick, *Ramsey Group, Inc v EGS International, et al*, 1:02CV77, U.S.D.C. Western District of North Carolina, Jun. 16, 2003, 24 pages.
Supplemental Expert Report of Bruce H. Dick, *Ramsey Group, Inc.* v *EGS International, et al*, 1:02CV77, U.S.D.C. Western District of North Carolina, Sep. 3, 2003, 17 pages.
Enviroguard brochure, <undated>, 3 pages.
Enviroguard Compliance and Safety Solutions Brochure, [undated], 11 pages.
Enviroguard Kit 28–200, [undated], 3 pages.
Enviroguard "Condor System", [undated], 1 page.
Enviroguard "Eagle System", [undated], 1 page.
Enviroguard "Hawk System", [undated], 1 page.
Enviroguard "Raven System", [undated], 1 page.
Calicorp, "Batt–Mat", product profile, [undated], 7 pages.
Calicorp, Invoices [various dates], 2 pages.
Calicorp, Aqueous Acid and Battery Electrolyte Spill Containment Products, 1998, 4 pages.1999, 3 pages.
Calicorp, Spill Containment Systems, CAL551–210, 5 pages.
Calicorp, "Battery Room Environmental Safety Product", 13 pages.
Minnesota Pollution Control Agency, "Spent Lead–Acid Batteries—Requirements for Generators", Hazardous Waste Division Fact Sheet #4.06, Jun. 1997, pp. 1–4.

Minnesota Pollution Control Agency, "Managing Spent Lead–Acid Batteries", Jan. 1995, 2 pages.
Minnesota Pollution Control Agency, "Used Lead–Acid Battery Storage", Aug. 1991, 3 pages.
Uniform Fire Code, 1997 Edition, 2000 Edition, Article 64 entitled "Stationary Lead–Acid Battery Systems".
Acran Spill Control Application Work Book and Spill Containment System specifications.
Spill Containment Regulations Summary (beings with 1991), [undated], pp. 3–7.
ACRAN Products and Services for the Back–up Power Industry "Neutra–Mat", CTL–255, Jan. 15, 1992, 1 page.
ACRAN Products and Services for the Back–up Power Industry "Safeflor", CTL–258, Jan. 15, 1992, 1 page.
ACRAN Products and Services for the Back–up Power Industry "Spill Containment Barrier", CTL–257, Feb. 11, 1992, 1 page.
ACRAN Products and Services for the Back–up Power Industry "Spill Containment Pits", CTL–256, Feb. 12, 1992, 1 page.
1994 Uniform Fire Code–"Article 64–Stationary Lead–Acid Battery Systems", *IFCI Fire Code Journal*, Section 64.101, 4 pages.
Van Ravenswaay, E.O., "Nonferrous Metals Industry: Copper Metal Processing", EPA, Office of Compliance, Sector Notebook Project, Report No. EPA 310–R–95–010, 2000; 3 pages.
Yuasa–Exide, "Installation Instructions for Yuassa Exide, Inc., Spill Containment Systems (SCS)", Section 80. 15, rev. Aug. 1995, rev. C, pp. 1–7.
1997 Uniform Fire Code, vol. 1–"Article 64–Stationary Lead–Acid Battery Systems", Section 6401, 3 pages.
Sluder, R., "Improvements in Acid–Proofing of Concrete and Steel", 1997, pp. 1–6.
PGI Technical Bulletin, "Copper Heap Leaching —A Case PVC Liners", May 1997, pp. 1–5.
Minnesota Pollution Control Agency, "Spent Lead–Acid Batteries–Requirements for Generators", Hazardous Waste Division Fact Sheet #4.06, Jun. 1997, pp. 1–4.
Department of Natural Resources, "Public Concerns Regarding the Proposed Crandon Mine and DNR Answers", Last revised Sep. 20, 1999, pp. 1–5.
Minnesota Pollution Control Agency, "Spent Lead–Acid Batteries –Requirements for Transporters", Hazardous Waste Division Fact Sheet #4.08, Sep. 1997, pp. 1–4.
Ramsey Group, Inc. Lead–Acid Battery Safety Products Brochure, [Varying dates], 142 pages.
Dukin, T.V., Townsend, R.D., and Cepak, M.D., "South Dakota Gold Mining: Regulations, Compliance, and Environmental History", Presented at Society for Mining, Metallurgy, and Exploration, Mar. 9–11, 1998, 15 pages.
Wisconsin Department of Natural Resources, "Waste Lead Acid Batteries: Management Requirements for Generators and Transporters", PUBL–WA–385, Apr. 1998, pp. 1–5.
1999 Uniform Fire Code –"Article 64 –Stationary Lead–Acid Battery Systems", pp. 2–7.
C&D Technologies, Inc., Power Solutions, "Flooded Battery Racks", 1999, 7 pages.
ETP, Inc., "Liners", 1999, 1 page.
"Environment Compliance for SLAB Systems", *Power Quality Assurance*, May/Jun. 1999, 3 pages.
2000 Uniform Fire Code –"Article 64 –Stationary Lead–Acid Battery Systems", 2 pages.

Wiman Plastics Corp., Safety Data Sheet, "Flexible Vinyl Sheets and Film", Jan. 01, 2000, 2 pages.
Cotton, K., "Noncompliance Can Cost You", *Power Quality Assurance*, Mar. 2001, pp. 13–18.
Colorado Lining International, "Coolguard/Urethanes", last modified Apr. 23, 2001, 3 pages.
APR, "Rigid and Flexible Liner", last modified May 24, 2001, 2 pages.
Ramsey Group, Battery Safety Products, printed Jul. 17, 2001, 4 pages.
Intrapack Corp., "The New Innovation in Spill Containment from IntraPack", faxed Oct. 9, 2001, 2 pages.
EnerSys "Spill Containment Systems", Jan. 2002, 2 pages.
Enviroguard, "Enviroguard Kit: EGS CRL 20–24", 1999, 4 pages.
Enviroguard, "Polypropylene Containment Pan Product Specification", 1999, 2 pages.
Ramsey Group, Battery Safety Products, printed Apr. 18, 2002, 73 pages.
Enviroguard, "Spill Containment Systems –A Containment Solution for Every Application", printed Feb. 12, 2003, 4 pages.
Calicorp, "Steel Spill Containment Systems for Battery Rooms", last modified Feb. 18, 1998, 2 pages.
Calicorp, "The Batt–Mat", last modified Dec. 16, 1997, 2 pages.
Fabrico, "Flexible PVC and other material liners for tanks and containment areas", printed Feb. 18, 2003, 3 pages.
KTH Sales, Inc., "Corrosion Resistant Specialties", updated Jan. 1999, 2 pages.
ACRAN "End–to–End Racks", [undated], 2 pages.
ACRAN "Spill Control", [undated], 5 pages.
Acran Products and Services for the Backup Power Industry, "Acurack –A Comprehensive Battery Rack System", [undated], 1 page.*
CDF, "Heavy Duty Contour Tank Liners", [undated], 3 pages.*

Enviroguard brochure, [undated], 4 pages.*
Enviroguard Compliance and Safety Solutions Brochure, [undated], 4 pages.*
Enviroguard Compliance and Safety Solutions Brochure, [undated], 11 pages.*
Enviroguard Kit 28–200, [undated], 3 pages.*
Enviroguard "Condor System", [undated], 1 page.*
Enviroguard "Eagle System", [undated], 1 page.*
Enviroguard "Hawk System", [undated], 1 page.*
Enviroguard "Hydrogen Monitor Product Specification", [undated], 1 page.*
Enviroguard "Modular Spill Containment Product Specification", [undated], 1 page.*
Enviroguard "Raven System", [undated], 1 page.*
Enviroguard "Sparrow System", [undated], 1 page.*
"Environmental Compliance and Safety for Stationary Lead–Acid Battery System (SLABS)", [undated], 2 pages.*
Field Lining Systems, Inc. "Plating Galvanizing & Anodizing", [undated], 4 pages.*
Field Lining Systems, Inc., "Products Available List", [undated], 5 pages.*
Field Lining Systems, Inc. "Concrete Embedments –Stud Liners", [undated], 3 pages.*
U.S. Liner Company, "Flexible Drop–In Liner", [undated], 2 pages.*
Vernoguard, "Containment Liner", [undated], 2 pages.*
Vernoguard, "Fuel Resistant Membrane", [undated], 2 pages.*
Spill Containment and Safety Products; A High Profit, Low Investment Opportunity, 33 pages.*
"Spent Lead–Acid Batteries –Requirements for Generators", *Hazardous Waste Fact Sheet #4.06*, Minnesota Pollution Control Agency, Jun. 1997, pp. 1–2.*

* cited by examiner

MODULAR SPILL CONTAINMENT SYSTEM AND METHOD

RELATED APPLICATIONS

This application is a continuation-in-part of co-pending U.S. patent application Ser. No. 09/960,759, filed on Sep. 21, 2001, which is a continuation of U.S. patent application Ser. No. 09/428,192, filed on Oct. 27, 1999, which issued as U.S. Pat. No. 6,308,728 B1 on Oct. 30, 2001, the entirety of which disclosure is incorporated herein by reference for all purposes.

FIELD OF THE INVENTION

The field of the invention is spill containment systems and methods, and more particularly, systems and methods for containing, neutralizing and/or monitoring spills from batteries or other devices.

BACKGROUND OF THE INVENTION

In our industrial society, devices often contain substances that may leak or spill undesirably onto other devices, personnel, or the environment. For example, batteries may be stored on battery racks or other structures where the batteries serve as a backup power supply for data communication centers and computers. These batteries may contain acidic or alkaline substances that may leak or spill onto other batteries, cables, equipment, and other devices as well as personnel, thereby posing a hazard to people and property. Sulfuric acid, commonly found in batteries, is an extremely hazardous material regulated by the federal, state and local governments. With respect to batteries, Article 64 of the Uniform Fire Code requires a four-inch high containment barrier with an acid neutralization capability to a pH of 7–9. Similarly, other devices may need containment systems. Such devices include but are not limited to air conditioning units that may drip water from condensation or leak freon, or water heaters that may leak water.

Therefore, it is desirable to contain leaks and spills from hazardous devices such as batteries. While spill containment systems exist, the existing systems need to be improved. For example, storage space for battery backup systems is precious and as companies become increasingly dependent on computers, their need for storing a greater number of batteries increases. Thus, companies utilizing battery backup systems would like to be able to store as many batteries as they can in their space, such as a warehouse or basement.

Further, batteries require regular maintenance and servicing. Some batteries need to be replaced, while others need to be tested. In the United States, Article 64 of the Uniform Fire Code mandates that a battery spill barrier be at least 4 inches high. Sometimes the high barrier gets in the way of people trying to remove a battery, testing the battery, maintaining the battery, or otherwise accessing the battery. Additionally, some batteries are heavy so fork lifts and heavy equipment lifting devices are used to lift the battery out or install the battery in a backup system.

Lastly, companies have widely diverse battery backup systems and warehouse rooms. Some rooms will have columns; others will have non-rectangular areas. Battery spill containment systems preferably should be able to be installed in virtually any of these diverse rooms.

Therefore, it is desirable to have improved designs of a battery spill containment system that permits a greater number of batteries to be stored in a given space, easy access to the batteries, and modularity of design.

SUMMARY OF THE INVENTION

A first embodiment of the invention relates to a battery spill containment system that includes a plurality of containment rails that define an area, at least one of the containment rails being removable, a liner placed within the area defined by the containment rails and a material placed in the liner to absorb and/or neutralize the spilled substance.

A second embodiment of the invention relates to a modular battery spill containment pan having a coupler to couple a plurality of pans together to define a variety of areas of containment.

DETAILED DESCRIPTION OF THE PREFERRED EMBODIMENTS

The invention relates to a spill containment system and method, which can apply to containment of spills from any kind of device, such as a battery. Where embodiments are directed to a battery spill containment system, it is to be understood that the system can be adapted for containing spills from other devices.

Figure 1:
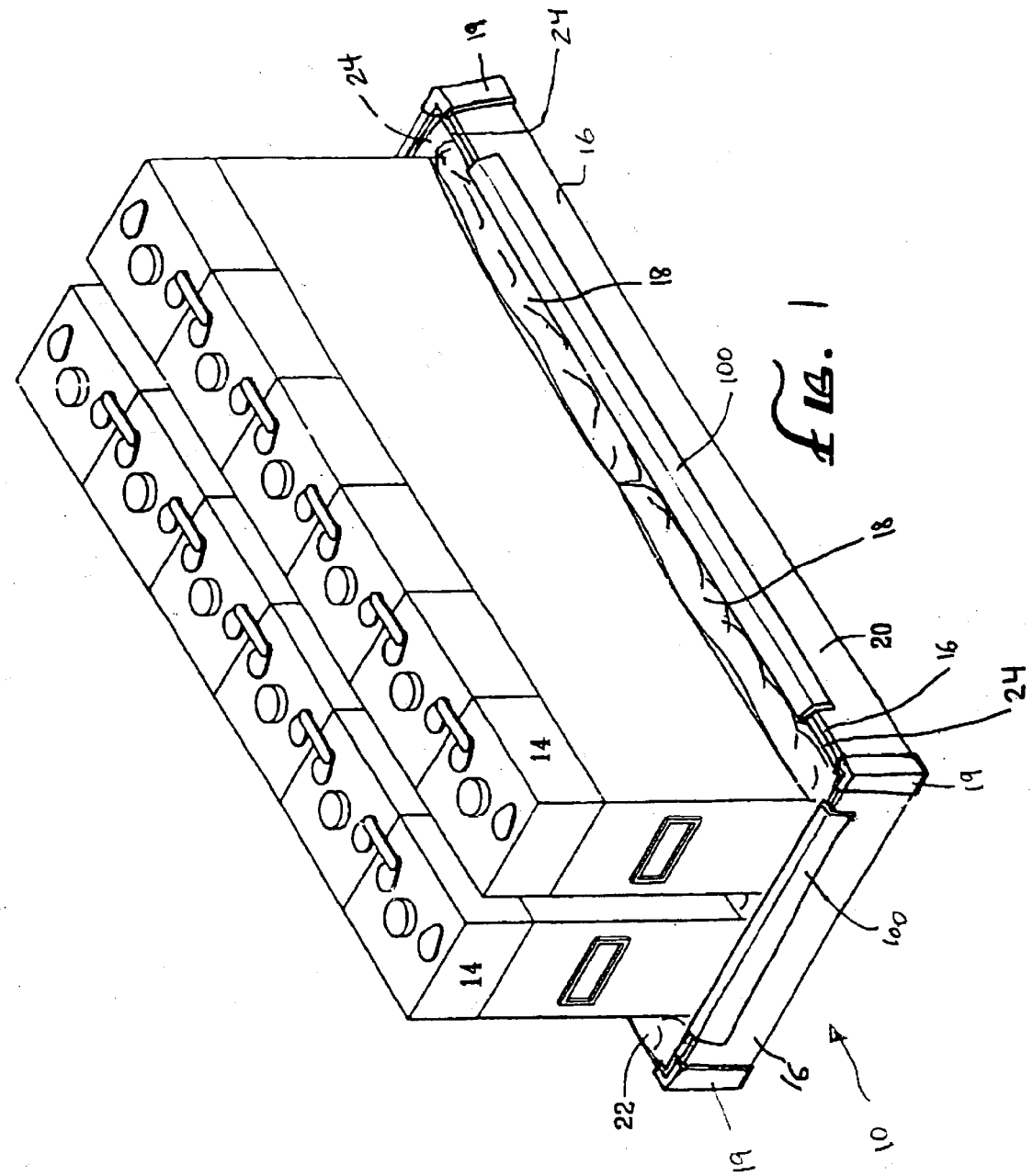
FIG. 1 is a perspective view of a first embodiment of an improved battery spill containment system with removable containment rails, as shown with batteries.

FIG. 1 is a perspective view of a battery spill containment system 10 that is shown holding batteries 14. The preferred embodiment of the improved battery spill containment system 10 comprises a plurality of rigid containment rails 16, corner couplers 19, a liner 24 and a material that absorbs and chemically neutralizes a battery spill, which material is preferably contained in a pillow 18 and/or sock 22. The couplers 19 hold the containment rails 16 together so that the containment rails 16 define a perimeter or area for housing at least one battery 14. Into the perimeter defined by the containment rails 16 is placed a liner 24, which preferably is resistant to damage from the battery spill. For example, if the battery contains a caustic substance such as an acid or a base, the liner 24 should be corrosion-resistant.

The corrosion resistant liner 24 is preferably fabricated of polyvinylchloride (PVC) with dielectric welded or thermal welded seams to prevent leakage at the seams or corners. For example, the material of the liner 24 may be coated with PVC on one side over a polyester web. As another example, the liner 24 may be fabricated out of a PVC thermoplastic material available as model C3000 (or C3 membrane) sold by Cooley Roofing Systems, Inc. (http://www.dupont.com/industrial-polymers/roofing/cooley.html) Model C3000 has been used in the roofing industry, but not in spill containment systems. As yet another example, the liner 24 may be fabricated out of a composite material such as a PVC-copolymer alloy composite. An example of a PVC-copolymer alloy is available from IB Roof Systems (http://www.Ibroof.com). Another example is a thirty-two ounce polyurethane available from FOSS Environmental and Infrastructure Inc. in Seattle, Wash. (http://www.fossenv.com). An embodiment of the liner 24 may have a thickness, for example, of 50 to 80 millimeters. Certainly, other thicknesses are permissible. If the liner 24 is very thin, the liner would be more flexible. By varying the thickness and/or material of the liner, the liner 24 may be flexible, semi-rigid (which is really a degree of flexibility), or rigid, as desired. Therefore, the liner 24 offers advantages that coatings like epoxy do not. In certain applications, one can use both a liner 24 and epoxy.

Alternatively, the liner 24 may be fabricated out of vinyl or any other material that is resistant to damage from the spilled substance. The liner 24 can comprise a single layer or a plurality of layers. The liner 24 may be cut and welded at its seams to form a liner of a desired shape. The liner 24 can be heat welded, or more preferably, dielectrically welded. Preferably, the liner 24 has an edge 102 (shown in FIG. 2) which rises about four inches to create an additional containment perimeter. The corrosion resistant liner 24 is preferably placed within the perimeter formed by the containment rail system 20, which means that the liner 24 can be entirely within or substantially within the perimeter. If the liner 24 is substantially within the perimeter, a portion of the liner 24 can be outside the perimeter. The liner 24 is preferably mounted to the containment rails 16 by a clip 100 or other mount. Attaching the liner 24 to the containment rail 16 prevents battery spills from getting under the liner 24.

Pillows 18 and socks 22 are preferably placed in the liner 24. Socks 22 are simply pillows in an elongate form. For the sake of convenience, the term "pillow" shall refer to pillows of any size, shape, and configuration, which includes socks. In the particular embodiment of FIG. 1, both pillows 18 and socks 22 are used. However, any of the embodiments described in this patent specification may use only pillows, only socks, neither pillows nor socks, or both. Depending on their content, the pillows 18 absorb and/or neutralize the spilled substance from the device. Many variations are possible. For example, the pillow 18 may be made of an absorbent material, while the material within the pillow may be a chemical neutralizer; the pillow 18 may be made of an absorbent material, while the material within the pillow may be both an absorbent and chemical neutralizer; the pillow 18 and the material within the pillow may be made of an absorbent material. In the preferred embodiment of a containment system directed to battery spills, the pillows 18 (together with the material inside the pillows) absorb and neutralize the acid spilled from batteries 14 so that the acid does not leak onto the floor. The system prevents the acid from leaking onto the floor in order to prevent a hazardous situation for employees who may slip and fall, or burn themselves on the acid, as well as to prevent the acid from damaging nearby property and devices such as computers. Often the batteries serve as a backup energy source for computers, telecommunications and data management systems, so it is important that spilled battery acid does not damage nearby cables and computers. If a liner 24 is not used, the pillows 18 and socks 22 may be placed directly within the perimeter formed by the containment rail system 20. As shown, the batteries rest on and are surrounded by pillows 18 and socks 22. Alternatively, the pillows 18 and socks 22 could be placed in any manner adjacent to the batteries 14. Optionally, a battery rack (not illustrated in FIG. 9) may be placed within the perimeter defined by the containment rail system 20 and batteries are then stored on the battery rack rather than on the pillows 18.

In a preferred embodiment, the containment rails 16 are also resistant to damage from the spilled substance. For example, the rails 16 can be formed out of a corrosion-resistant material such as PVC, vinyl, fiberglass, polypropylene, and certain plastics. As another example, the rails 16 can be covered with a protective coating or otherwise treated to protect the rail from damage. In one embodiment, the rails 16 are constructed out of 16 gauge sheet metal and coated with a material to make them resistant to and less likely to be damaged by the spilled material. For example, the containment rails 16 may be preferably coated with a layer of PVC to a thickness of 10–15 millimeters or epoxy paint. It is further preferable that all surfaces of the containment rails 16 be coated by PVC or epoxy paint. For instance, any holes, flanges, or slots in the containment rails 16 may be coated by PVC. Alternatively, the containment rails may be epoxy painted instead of PVC coated. Thus, the containment rails 16 of each embodiment described in this patent specification may be fabricated out of metal, plastic, polypropylene, PVC, composites, vinyl, fiberglass, any other suitable material, as well as any of these materials with a protective coating. The containment rail system may be a bright safety yellow per OSHA standards.

The containment rail system 20 may be formed in a variety of ways. For example, the containment rail system 20 may be formed out of a unitary structure, which is cast, bent to form corners, cut to size, or otherwise formed to define a perimeter. Of course, as with any embodiment described herein, the perimeter can use some other structure as part of the fully enclosed perimeter, such as a wall. As another example, the containment rail system 20 may be formed out of a plurality of containment rails 16. Containment rails 16 themselves may have varying sizes, shapes and configurations. For example, see the disclosure of U.S. Pat. No. 6,308,728. The rails 16 may have predetermined lengths, custom lengths, or adjustable lengths. The corners and edges of each containment rail may be rounded if desired.

The containment rails 16 may be adjustable. The containment rail 16 may have a slot to allow the rail to be slidably mounted to the floor or other components to form a containment rail system 20 of variable dimensions. The number, shape and dimensions of the slots may be changed as desired. Instead of slots, the adjustable containment rails 32 may have a plurality of mounting holes 34 that allow the installer to adjust the size, shape and configuration of the containment rail system 20 by selecting the mounting hole to use. For additional examples of adjustable containment rails, see U.S. Pat. No. 6,308,728 B1, issued on Oct. 30, 2001.

The individual rails 16 of the containment rail system 20 may have no flanges, flanges that protrude inward toward the batteries, or flanges that protrude outwardly. If the flanges protrude inwardly or are non-existent, the smooth outer surfaces of the containment rail system 20 increases the aisle width and does not interfere with surrounding equipment or personnel. Smooth exterior surfaces may be desirable to reduce the hazard of tripping personnel who walk by the system.

The containment rail 16 may be a straight, curved, or corner rail. For example, a corner rail may be a ninety degree corner, a sixty degree corner, a forty-five degree corner, or any other corner as desired. As with any of the embodiments of any of the components or systems described in this patent specification, the dimensions, size, shape and/or configuration of the particular corner containment rail may be changed as desired for the particular application.

The containment rails 16 can be mounted directly to each other to form an area for holding a battery, or they may be mounted indirectly so as to prevent substantial movement of one rail relative to another rail.

Figure 2:
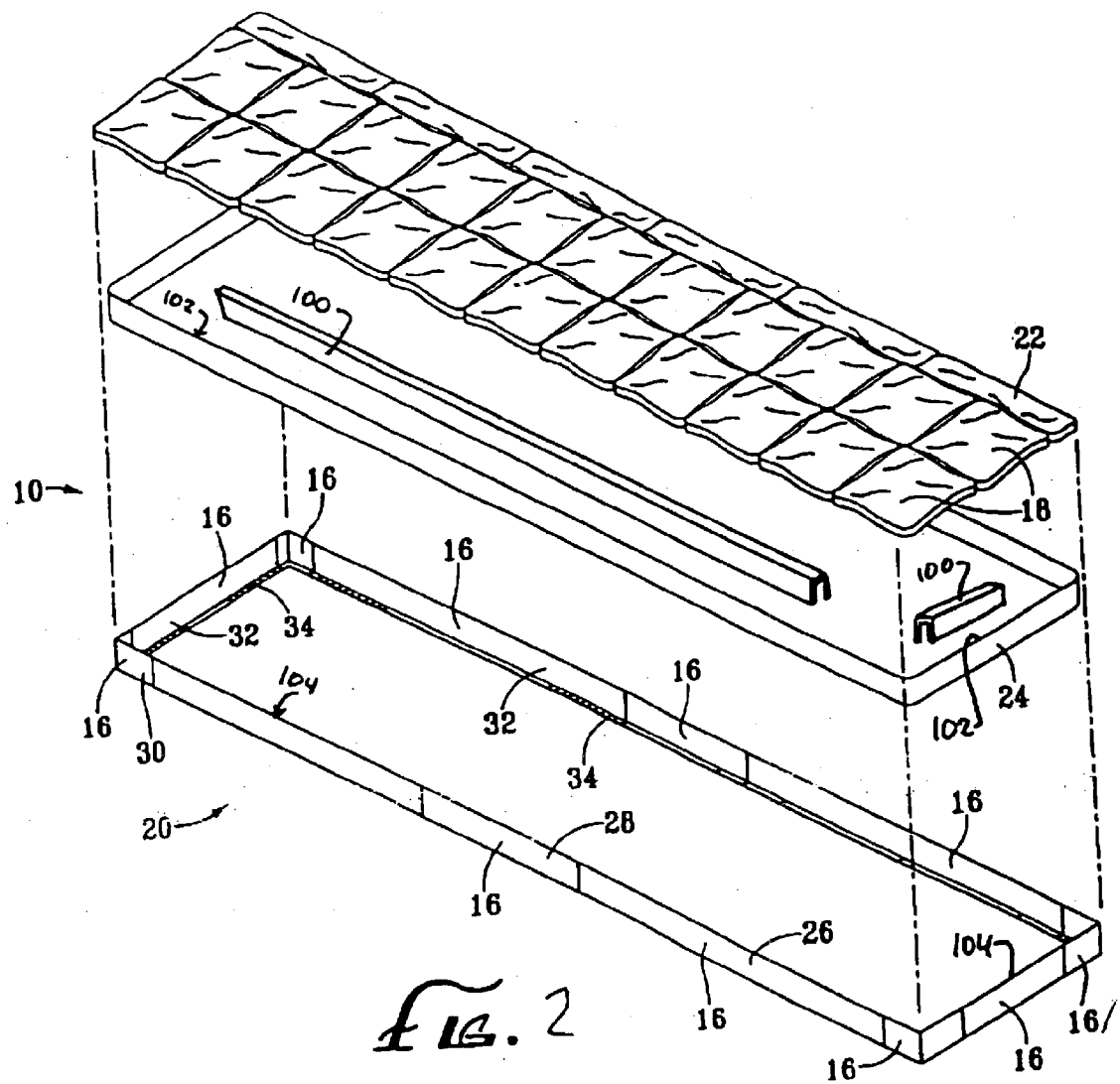
FIG. 2 is an exploded piece-part drawing of a first embodiment of an improved battery spill containment system having a removable containment rail.

The couplers 19 (or mounts 19) may be any kind of coupler, clip, or even a corner rail. The couplers 19 may have slots into which the containment rails 16 slide. Alternatively, the coupler 19 or mount may be a bolt, a screw, a wing nut, adhesive, a clip, a U-clip, a spring-tensioned clip, a staple, or some other coupler. Still alternatively, the corner couplers 19 may be omitted where the containment rails 16 abut each other and are held in place by some other means. For example, as illustrated in FIG. 2, if clips 100 hold the top edge 102 of liner 24 to the top edge 104 of a containment rail 16, this arrangement can be sufficiently secure to allow the containment rails 16 to define a stable perimeter for housing a battery and yet avoid the use of the corner couplers 19. In essence, the clips 100 and liner 24 act as a coupler. Still alternatively, clips 100 may not be required when the top edge 104 of the containment rail 16 has a hook or other securement mechanism to which the liner 24 may attach. The length of the clips 100, of course, may be changed as needed. For example, one may use one long clip 100, or many short clips 100. The shape and configuration of each clip 100 may also be changed as desired. Although FIG. 2 illustrates a U-shaped clip 100, the clip 100 can have a different shape.

Therefore, advantageously, the spill containment system 10 may be configured to have any desired shape or size, including, for example, an L-shape, U-shape, or any other shape.

As with any of the embodiments of any of the components or systems described in this patent specification, the dimensions, size, shape and/or configuration of each particular component or the entire system may be changed as desired for the particular application.

Although FIG. 1 illustrates an example embodiment where the containment rails 16 and liner 24 are about the same height, such as 4 inches, the heights may be changed, as desired. In another example embodiment, the containment rails 16 preferably have a height of two or three inches; the liner 24 has a height of four inches and is flexible or semi-rigid. The 4 inch height of the liner 24 satisfies Article 64 of the Uniform Fire Code by providing a 4 inch spill barrier. However, because the containment rails 16 are shorter than 4 inches and the 4 inch flexible liner 24 can be bent down, it is easier to access, maintain, check, test and replace batteries 14, even without removing the containment rails 16. If desired, a containment rail 16 can be removed by removing clips 100 and/or couplers 19, which permits the flexible liner 24 to be bent down even more, thereby providing even greater access to the batteries 14. In an example installation where a plurality of spill containment systems 10 are mounted vertically, the systems 10 can be closer together so that a greater number of batteries may fit in the same vertical space. Further, it is important to allow the normal use of battery lifting equipment because batteries in a battery rack must be serviced regularly and replaced as needed. It may be possible to use battery lifting equipment, such as a fork lift, when the containment rails 16 are removed and the flexible liner 24 bent down to permit the fork lift to get under a battery to lift it.

In another embodiment, the containment rails 16 and the liner 24 both have a height of 4 inches, such as depicted in FIG. 1. In this example, the removability of the containment rails 16 via removal of clips 100 and/or couplers 19 creates greater access to the batteries 14 and allows more batteries to be stored vertically. Of course, as with any of the embodiments and examples described in this patent specification, the dimensions, size, shape and/or configuration of the spill containment system and any of its components may be changed as desired for the particular application.

Figure 3:
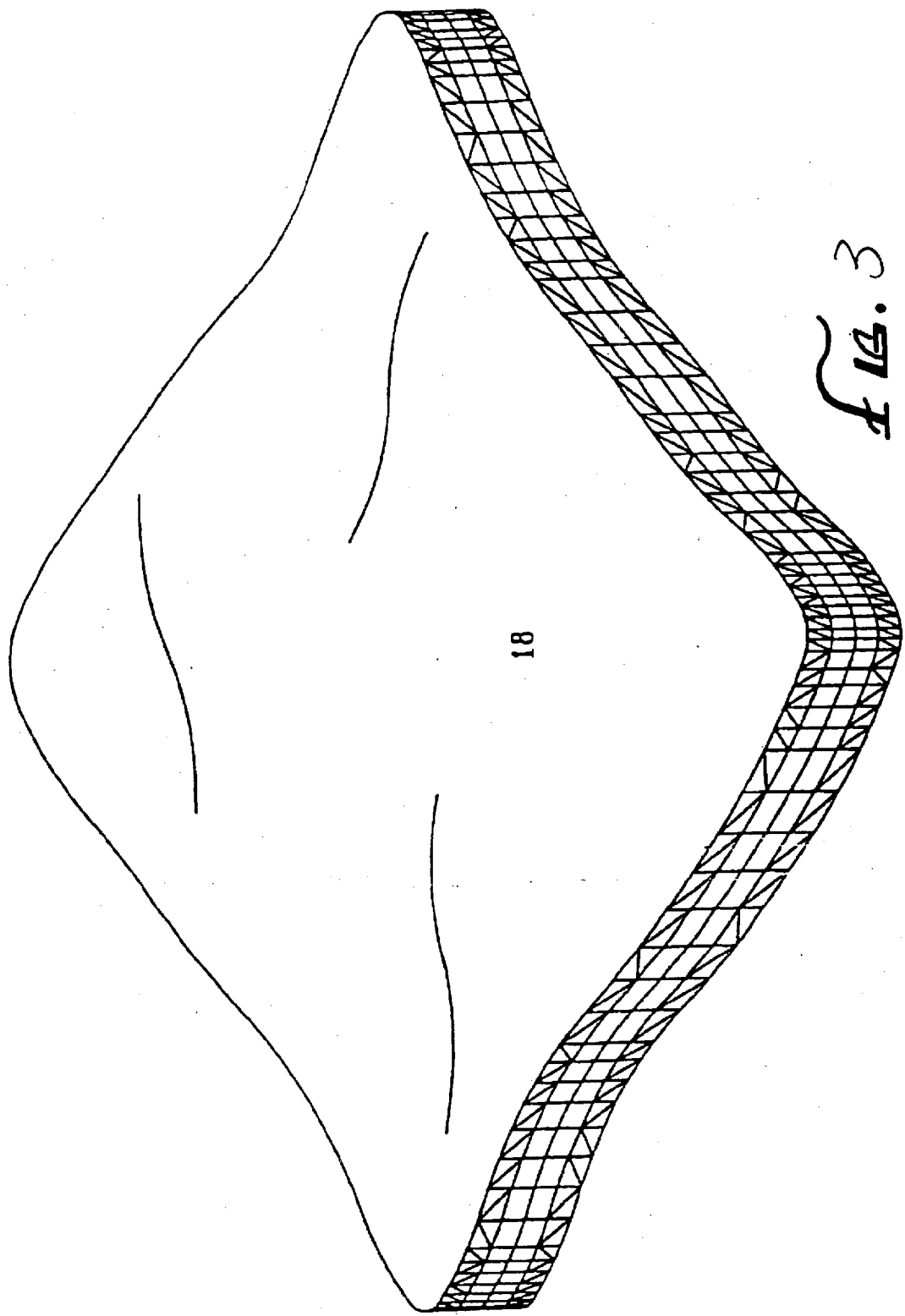
FIG. 3 is a perspective view of a pillow.
Figure 4:
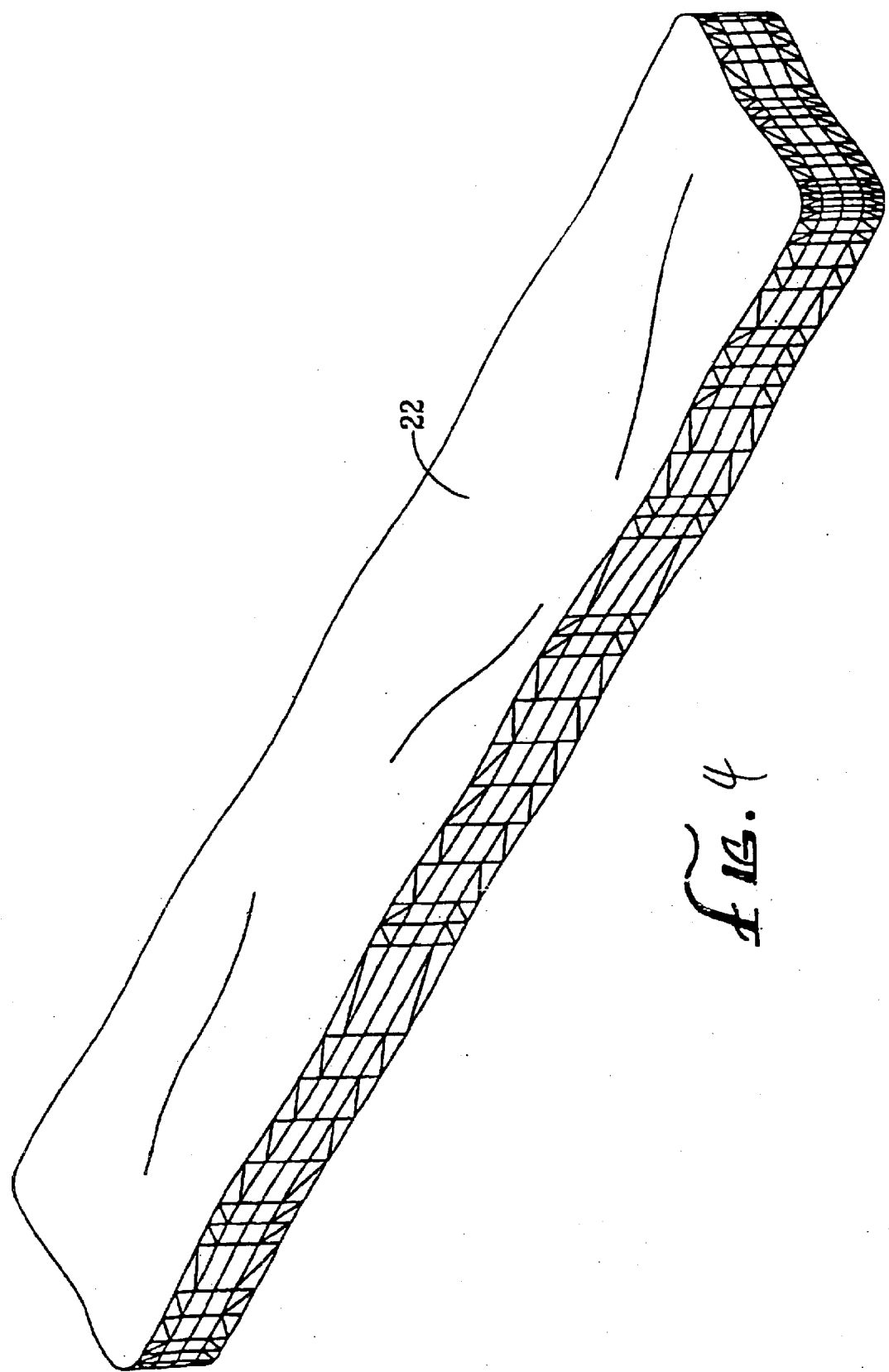
FIG. 4 is a perspective view of a sock.

FIG. 3 is a perspective view of a pillow 18. The pillow 18 is preferably made from spunbound polypropylene material. When exposed to a flame, the pillow 18 also preferably melts instead of ignites. In this particular embodiment, the pillow 18 is fabricated out of a fabric and filled with a neutralizing material such as soda ash blended with an absorbent material such as vermiculite. In the alternative, any caustic base solution may be used. Thus, the pillow absorbs and retains moisture and also neutralizes acids. Optionally, a coloring agent may be added to the pillow 18 so that when acid contacts the pillow 18, the coloring agent soaks through the polypropylene fabric to alert personnel that an acid spill has occurred. The sock 22, illustrated in FIG. 4, may be fabricated the same as a pillow 18. Each pillow and sock may optionally be marked with an unique serial number for tracking purposes. The weight of a pillow 18, for example, may be 2.8 to 5 ounces, although other weights are certainly allowable.

Figure 5:
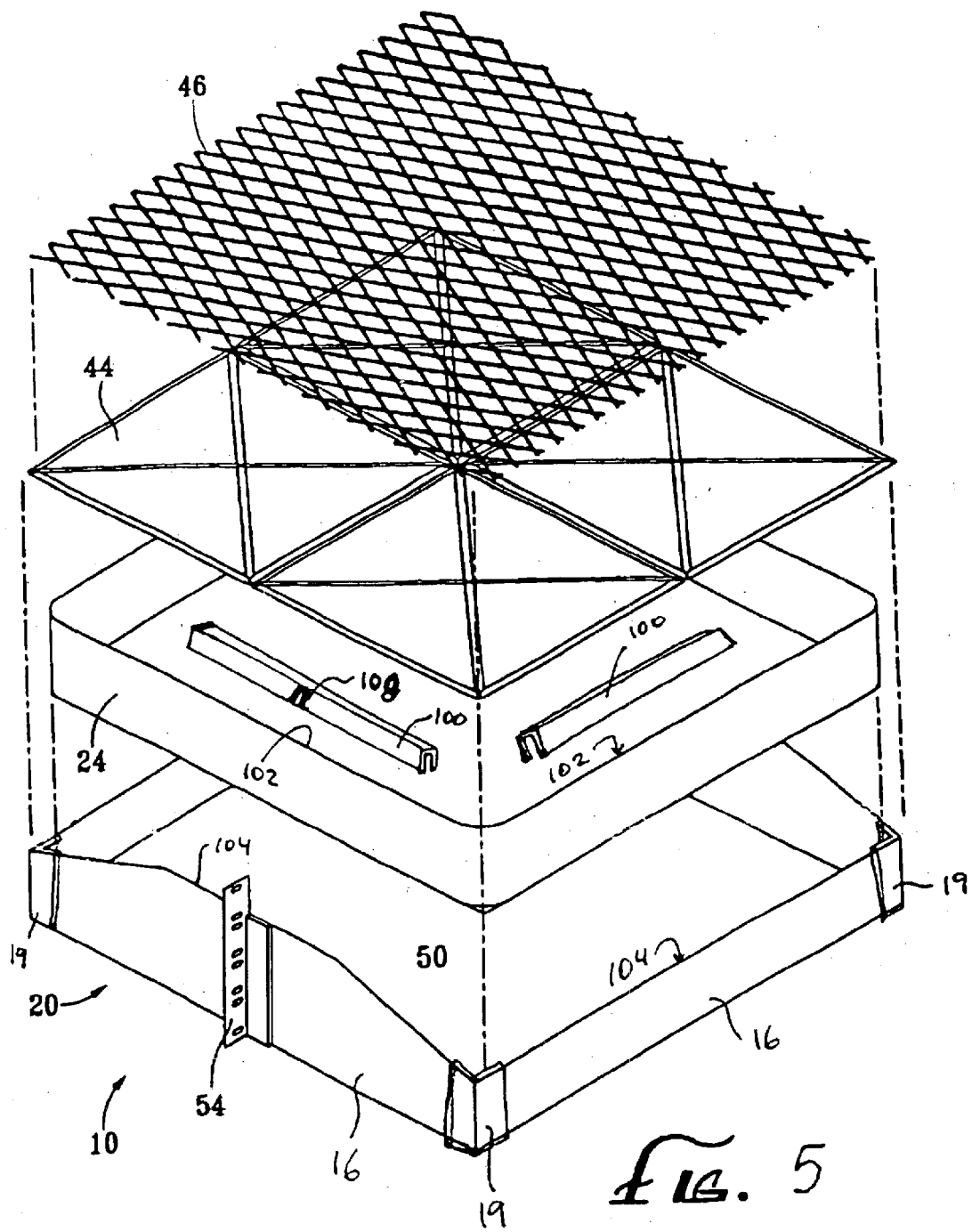
FIG. 5 is an exploded piece-part drawing of a first embodiment of a battery spill containment system that uses a pad and grid which sits underneath batteries.
Figure 6:
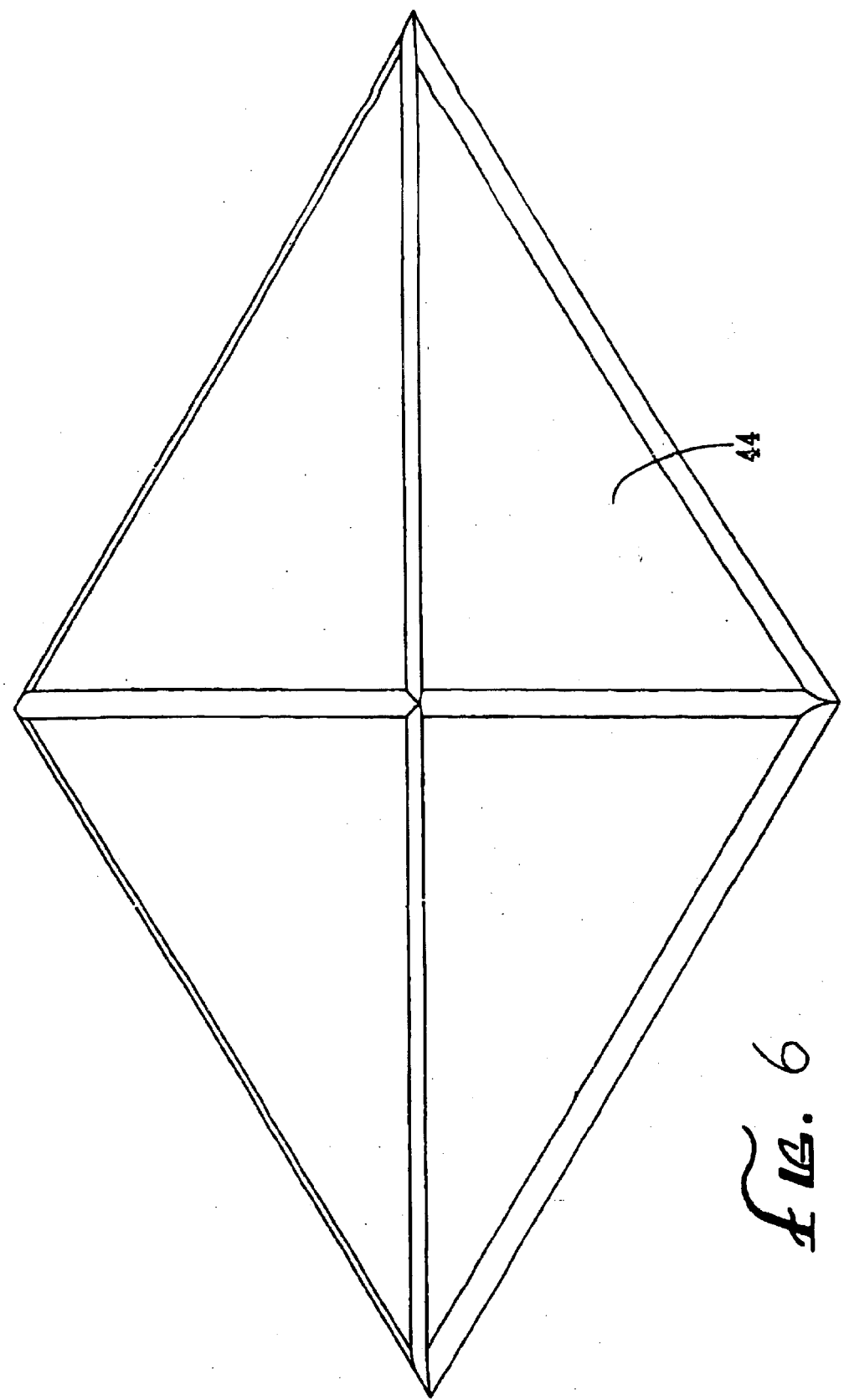
FIG. 6 is a drawing of a pad.

FIG. 5 is an exploded piece-part drawing of a battery spill containment system that uses a pad 44 and optional grid 46. The system preferably comprises a containment rail system 20 formed by containment rails 16, couplers 19, a corrosion resistant liner 24, a pad 44 and a grid 46. Containment rails 16 are mounted by the couplers 19 to form the containment rail system 20. A corrosion resistant liner 24 is preferably, but optionally, inserted into the containment rail system 20. Of course, clips 100 may be used to attach the top edge 102 of the liner 24 to the top edge 104 of the containment rail 16. A pad 44, also shown in FIG. 6, is placed into the corrosion resistant liner 24. The pad 44 is preferably made of the same material and serves the same purpose as pillow 18 and sock 22, in which case, the pad 44 is essentially a thin pillow 18. The pad 44 is particularly suited for containing spills from valve regulated lead acid (VRLA) batteries because VRLA batteries do not leak as much as some other batteries and thus, the pads do not need to be as thick as the pillows. VRLA batteries do not leak as much because they are typically sealed batteries and contain a gel instead of liquid acid. An optional grid 46 is then placed on top of the pad 44 in order to protect the pad 44 from the battery. The grid 46 may be made of a metal which may be corrugated for strength to hold heavy objects such as a battery. The metal grid also may be PVC coated to make it resistant to the spilled material. Alternatively, the grid 46 may be a perforated PVC sheet where the perforations allow the spilled substance to drip through and onto the pillows.

The containment rail system 20 may include an optional mount 54, for mounting the containment rail system 20 to a structure such as a rack, wall, another containment rail system, or vertical stanchion. In this case, the clip 100 may have a notch 108 to accommodate for the mount 54, or shorter clips 100 may be used.

In an example embodiment, the pad 44 may have a thickness of a quarter inch, and the grid may be one-sixteenth of an inch thick.

Figure 7:
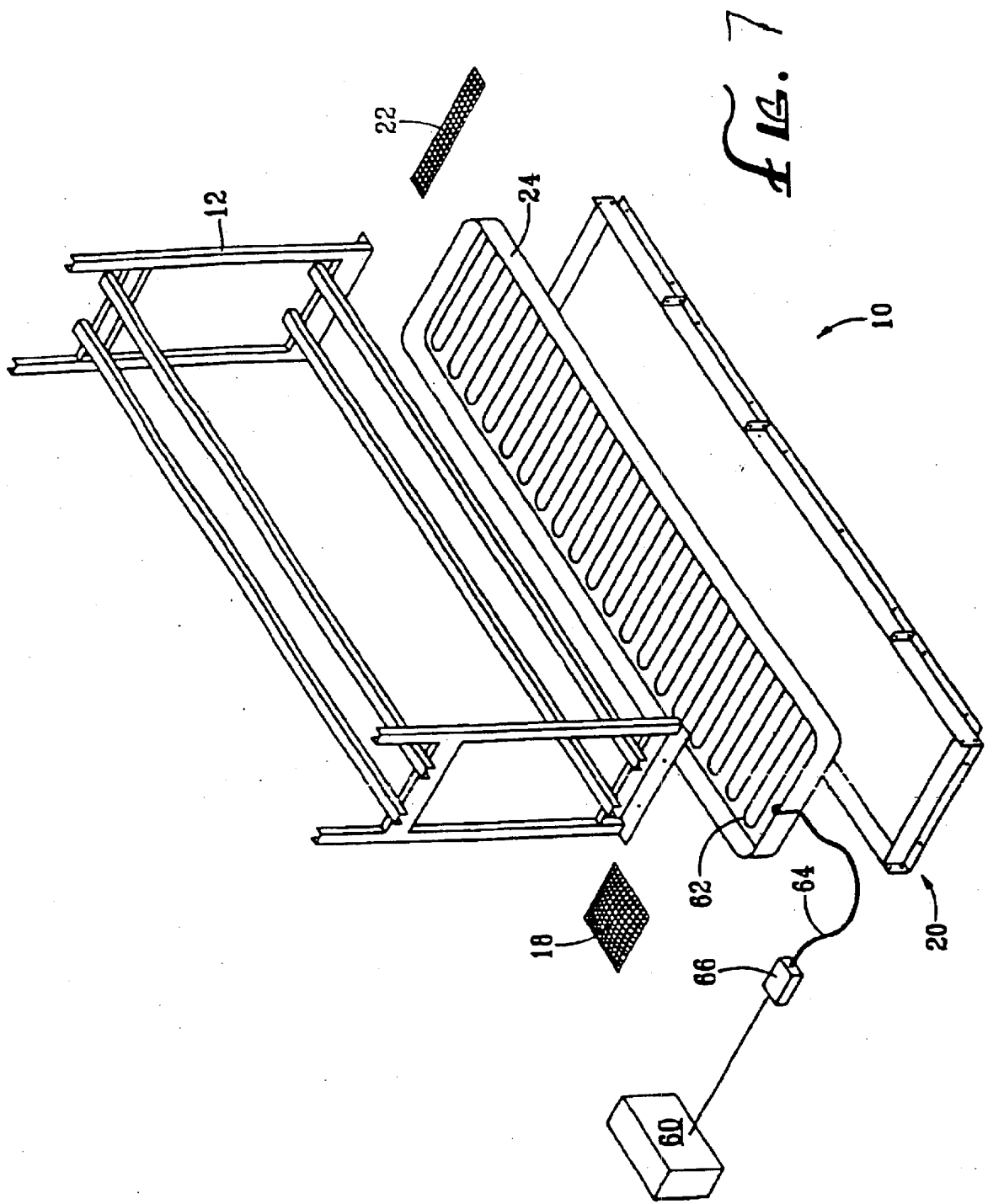
FIG. 7 is an exploded piece-part view of a battery spill containment system, a leak detection device and a battery rack.

Additional features are possible. For example, a leak detection device 60 may detect and indicate whether a leak or spill from a device has occurred. FIG. 7 is an exploded piece-part view of a battery spill containment system 10, a leak detection device 60 and a battery rack 12. The containment rail system 20 may be any of the containment rail systems described in this patent specification. Preferably, the containment rail system 20 is mounted to the floor. A corrosion resistant membrane or liner 24 is inserted into the containment rail system 20. A leak detection device 60 comprises a leak detector 62, a lead 64 and a leak indicator 66. The leak detector 62 may use any of a variety of known methods to detect the presence of a leak or spill of any substance including water and acids. For example, one embodiment of the leak detector 62 is now described. In this example embodiment, the leak detector 62 may be a cotton sleeve that holds two conductor strands in close proximity to each other. Each of the conductor strands is wrapped by a braided fiberglass material so that the two conductor strands are not shorted together. One end of the two-conductor sleeve system is split so that one conductor connects to one end of a 3.9 M ohm resistor while the other conductor connects to the other end of the resistor. The other end of the two-conductor sleeve system is also split where one conductor goes to a first lug inside the leak indicator 66 and the other conductor goes to a second lug inside the leak detector 66. Specifically, one embodiment of conductors uses seven conductors, 728 stranded, 20 aug. A current flows through the circuit formed by the two conductors and the resistor to the leak indicator 66. The cotton sleeve acts as a wick to draw fluids and liquids to the two conductors. Fluids that reach the conductors pass through the fiberglass material and contact the conductors, causing the conductors to short together. The shorting of the conductors decreases the effective resistance and increases the current flow. When the leak indicator 66 detects an increase in current or a decrease in resistance across the first and second lugs, the leak indicator 66 determines that a leak or spill has occurred. The leak detector 62 preferably is able to detect leaks or spills that fall anywhere on liner 24. For example, the leak detector 62 may be in a coil or zigzag shape to cover a large area of the liner 24. Other configurations are possible and included within the scope of this invention. The leak detector 62 may be embedded into the liner 24 or simply rest on its surface. The leak detector 62 passes information about the presence or absence of a spill through a lead 64 to leak indicator 66. The leak indicator 66 indicates to personnel whether a spill or leak has occurred, through for example, an audible or visual alarm, or any other known mechanism for indicating the presence or absence of a condition. The leak detector 66 may optionally have a plurality of states that indicate the amount of spillage. For instance, if the leak detector 66 is based on an audible or visual alarm, the leak detector 66 may increase its audible alarm or flash more lights as the amount of spillage increases. Still further, the leak detector 66 may not only serve monitoring and indication functions, but also communication functions. For example, the leak detector 66 may communicate by radio frequency signals, infrared light, data over a fax/modem line, data over a telephone or other data line, or a direct connection to a fire alarm, security guard station, or other alarming/monitoring systems. The leak detector 66 may have an electrical connection that permits (e.g., a dry "C" contact) customer communication with the site. Still alternatively, when the leak detector 66 detects a spill, or alternatively a severe enough spill, the leak detector 66 may cause certain events to occur, including but not limited to the issuance of an alarm to the proper personnel, the shutting off of equipment, or the diversion of power resources to other non-leaking batteries. The leak detection device 60 may be powered by AC current, its own battery source, or one of the batteries in the battery rack.

Figure 8:
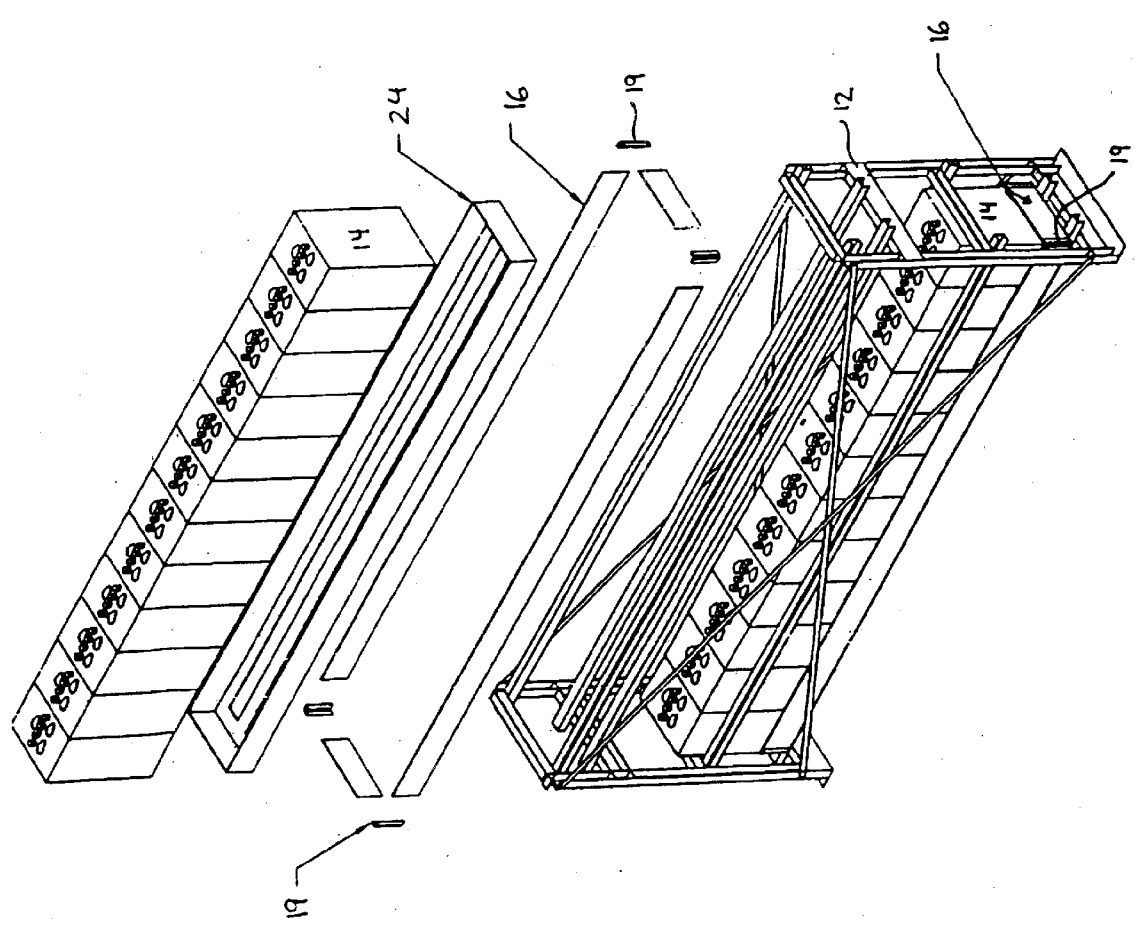
FIG. 8 is an exploded perspective view of a battery spill containment system having removable containment rails when a battery rack is used.

FIG. 8 is an exploded perspective view of a battery spill containment system having removable containment rails 16 when a battery rack 12 is used. Instead of having batteries 14 rest on the liner 24 or pillows 18, a battery rack 12 may be used. The battery rack 12 may have its feet surrounded by spill containment systems, or as illustrated in FIG. 8, the battery rack 12 may include spill containment systems on each level that holds batteries 14. Because the containment rail 16 is removable, for example, by removing the coupler and/or clips (not shown in FIG. 8), users have easy access to the batteries 14 and a greater number of batteries 14 can be stored in a given vertical space.

Figure 9:
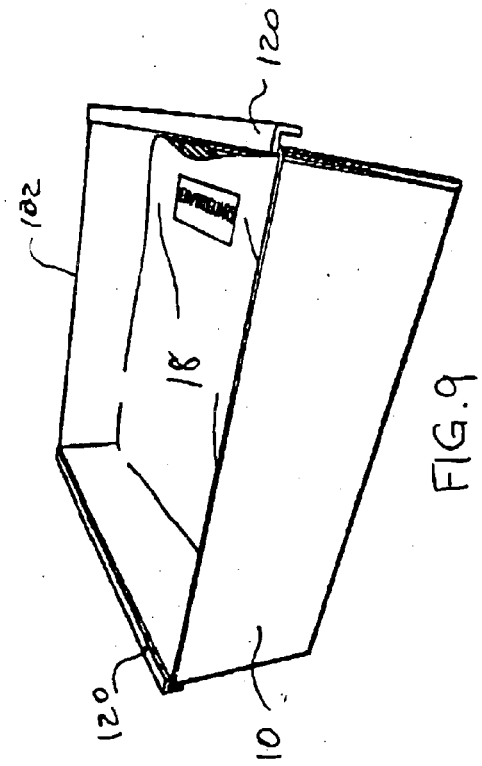
FIG. 9 is a perspective view of an embodiment of a modular spill containment pan.
Figure 12:
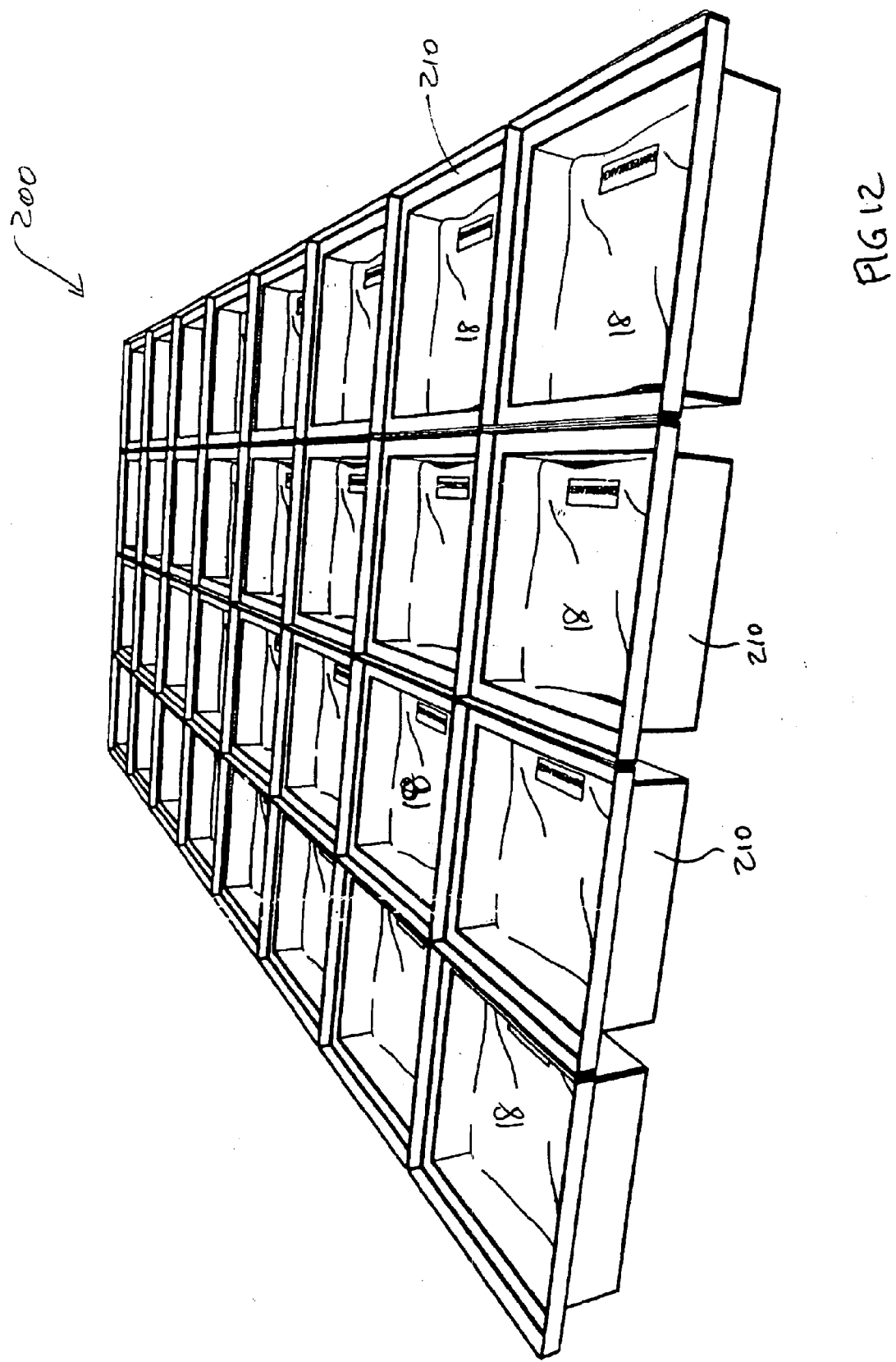
FIG. 12 is a perspective view of an example embodiment of a modular battery spill containment system in an example configuration.

FIG. 9 is a perspective view of an embodiment of a modular spill containment pan 110. The modular spill containment pan 110 is preferably resistant to damage from the spilled substance by comprising a corrosion-resistant material such as polyvinylchloride, fiberglass, or vinyl. Alternatively, the modular spill containment pan 110 may include a corrosion-resistant coating on, for example, a metal. The modular spill containment pan 110 comprises a base with walls, into which pillows 18 or socks can be placed. Preferably, the modular spill containment pan 110 includes an integrally formed clip 120 for connecting the wall of the pan 110 to the wall of another pan or to another structure. Each pan 110 may have any number of integral clips 120, but the preferred embodiment has two U-shaped clips 120 at opposite ends of each other. Alternatively, the clips 120 can be on two adjacent sides of pan 110. Still alternatively, the clips 120 can be separate clips that couple the top edge 122 of the pan 110 to the top edge 122 of another pan 110. As with any of the clip 120, 100 and couplers 19 described in this disclosure, the clips and couplers may be made out of any suitable material, such as fiberglass, PVC, certain plastics, polypropylene, metal, or any other material, and any of these materials protected by a coating. Preferably, the clips and couplers are resistant to damage from the spilled substance. By connecting these modular pans 110 together, in any desired size or configuration, one can create a battery spill containment system 200 as shown in FIG. 12. As shown in FIG. 12, the individual pans 210 do not have integrally formed clips, but can be adapted to have them. In the example embodiment illustrated in FIG. 12, separate clips, such as clips 100 in FIG. 2, may be used to connect the top edges of the pans 210 together.

Additionally, as illustrated in FIGS. 15A–15C and 16, an optional plug 252 may be used at each corner of a pan 210 that is adjacent a corner of another pan, which plug 252 prevents any battery spill from leaking between the corners of the pans. Preferably, the plug 252 is resistant to damage from the spilled substance and may be made out of any suitable material, such as fiberglass, PVC, certain plastics, polypropylene, metal, or any other suitable material, and any of these materials protected by a coating.

Figure 10:
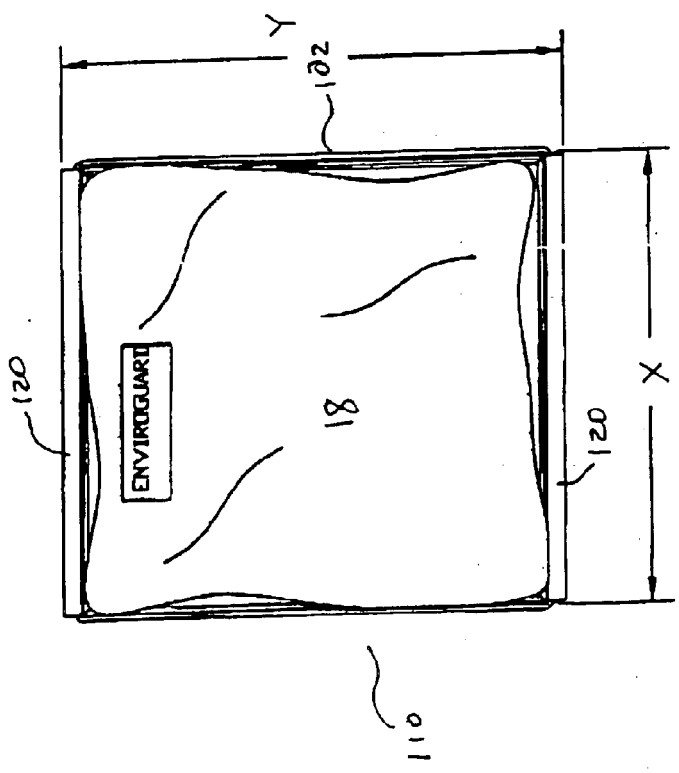
FIG. 10 is a top view of the modular spill containment pan of FIG. 9.
Figure 11:
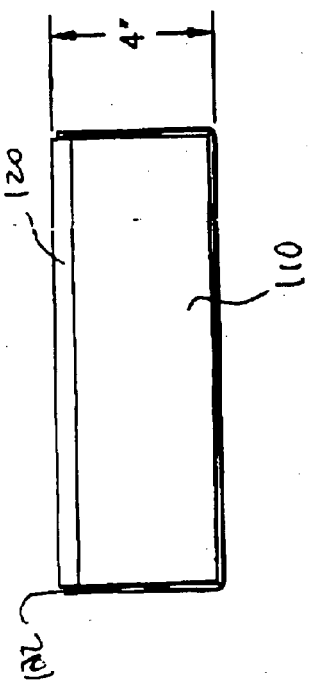
FIG. 11 is a side view of the modular spill containment pan of FIG. 9.

FIG. 10 is a top view of the modular spill containment pan 110 of FIG. 9. FIG. 11 is a side view of the modular spill containment pan 110 of FIG. 9. The dimensions X and Y of the pan 110 may be varied as desired. There may also be pans of different sizes so that the customer can select the appropriate ones. However, the height of the pan 110 is preferably 4 inches.

Figure 13:
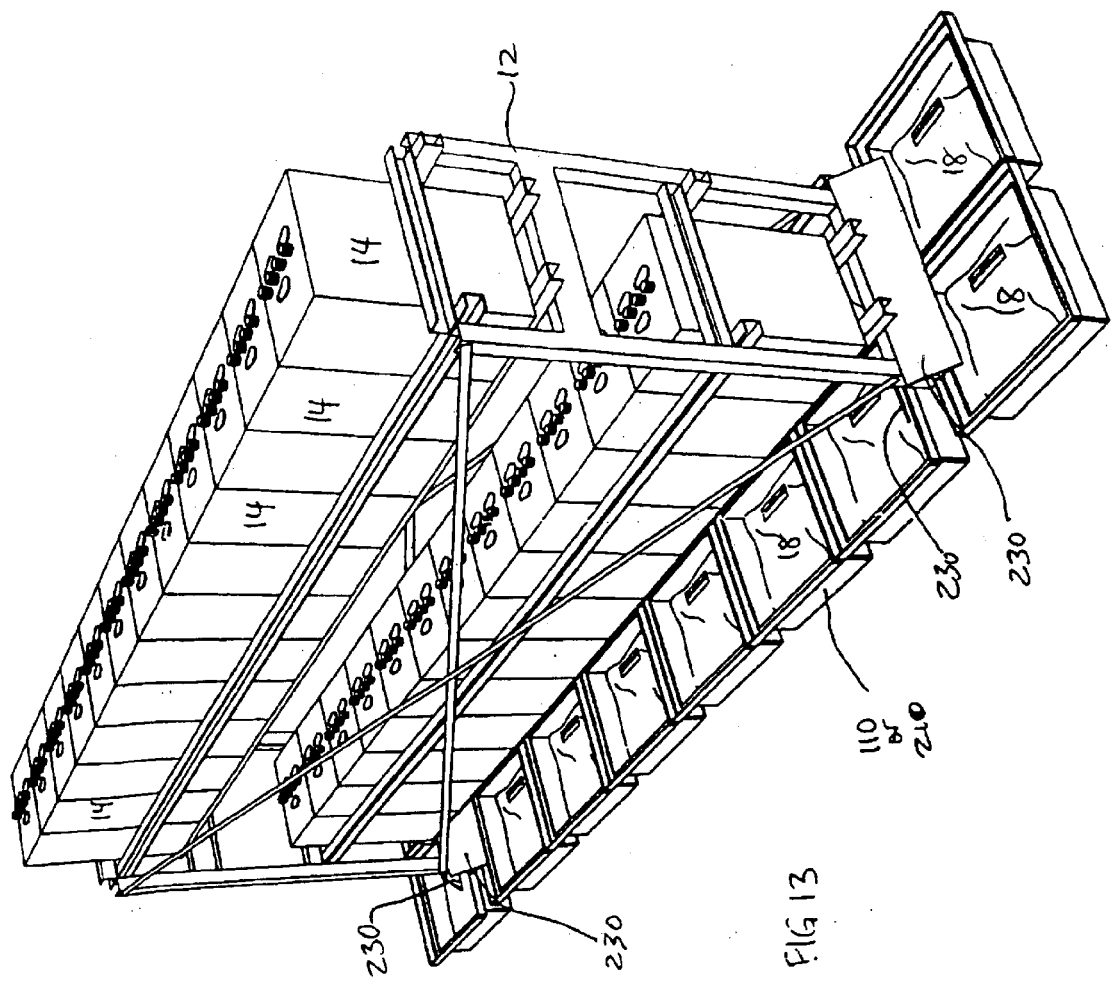
FIG. 13 is a perspective view of a modular pan battery spill containment system shown with a battery rack.
Figure 14:
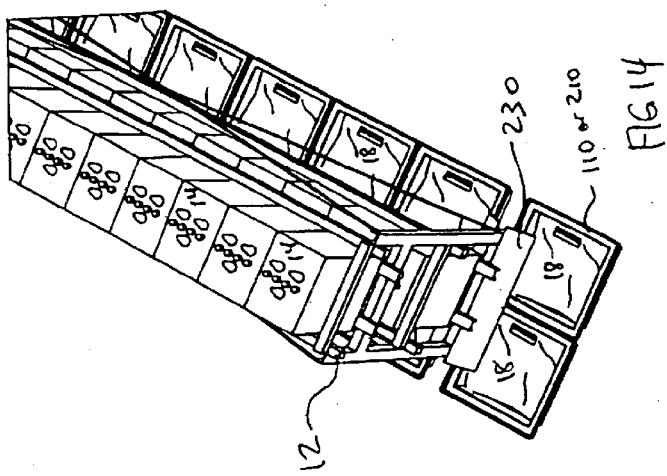
FIG. 14 is another perspective view of the modular pan battery spill containment system of FIG. 13.
Figure 15A:
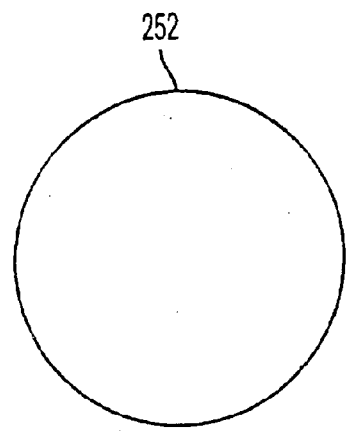
FIGS. 15A–15C are top and side views of a plug that may be used in modular pan battery spill containment system of FIGS. 12 or 13.
Figure 15B:
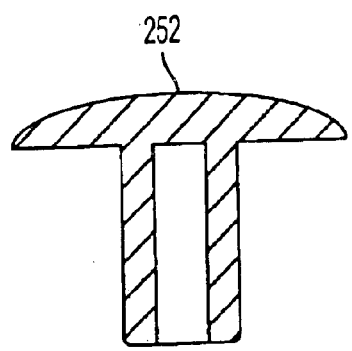
Figure 15C:
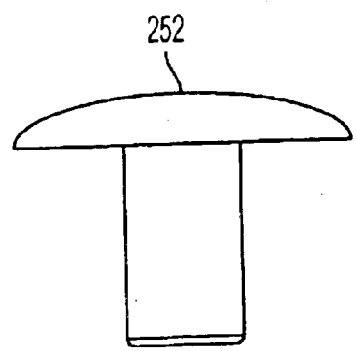

A plurality of modular pans 110 or 210 can be connected together to surround a battery rack 12, as shown in FIGS. 13 and 14, which are perspective views of a modular pan battery spill containment system installed with the battery rack 12. A diversion device 230 may be attached to the battery rack 12 to divert any battery spill into a modular pan 110 or 210. Preferably, the diversion device 230 is resistant to damage from the spilled substance and may be made out of any suitable material, such as fiberglass, PVC, certain plastics, polypropylene, metal, or any other suitable material, and any of these materials protected by a coating. Additionally, the diversion device 230 should be installed at an angle to deflect spilled substance into a modular pan 110 or 210. The size, shape and dimensions of the diversion device 230 can certainly be changed as desired. The diversion device 230 can include additional features such as rails to create a channel for directing the flow of the spilled substance. Preferably, a pillow 18 or sock 22 filled with a material that absorbs and chemically neutralizes a battery spill is placed in each pan 110 or 210.

Figure 16A:
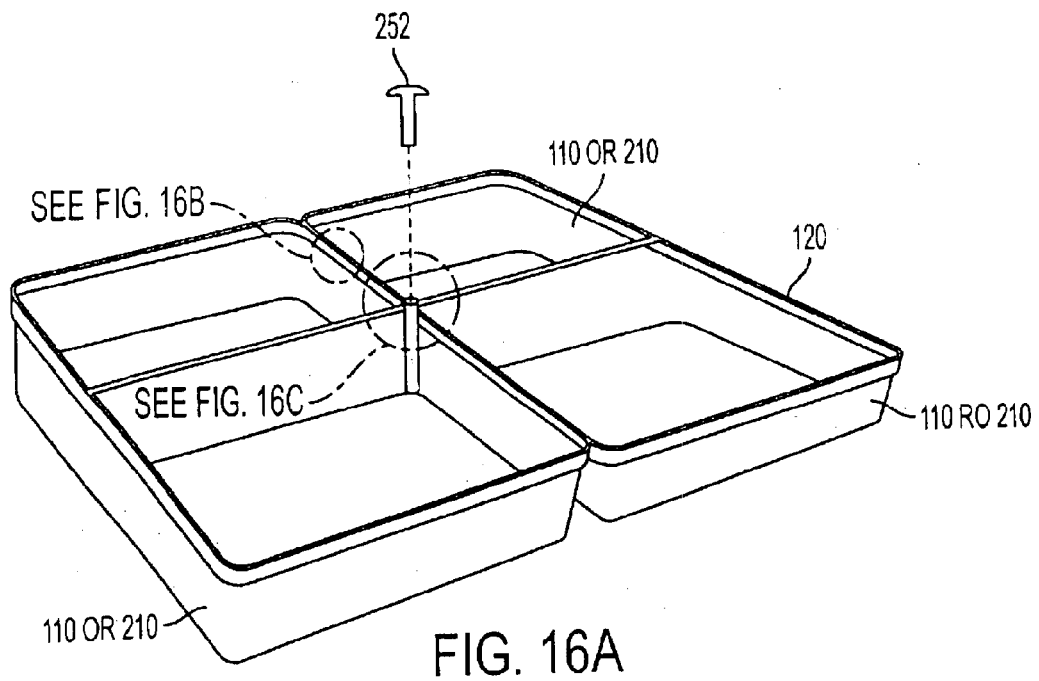
FIG. 16A illustrates a perspective view of a modular pan battery spill containment system with a plug and clips.
Figure 16B:
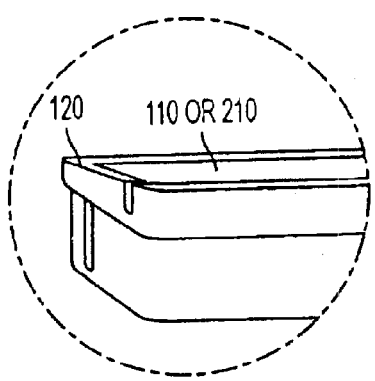
FIGS. 16B and 16C illustrate inset blowup views of a modular pan battery spill containment system, as illustrated in FIG. 16A.
Figure 16C:
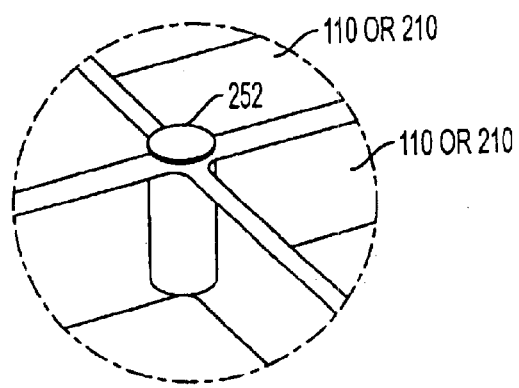

FIG. 16A illustrates a perspective view of a modular pan battery spill containment system with a plug and clips. FIGS. 16B and 16C illustrate inset blowup views of the modular pan battery spill containment system illustrated in FIG. 16A. Modular pans 110 or 210 are coupled to one another. Preferably, each pan 110 or 210 has a clip 120, which is preferably integrally formed with the pan. The clip 120 permits each pan 110 or 210 to be coupled to another pan or device while also serving to prevent a spilled substance from flowing between pans instead of into the pans. Additionally, plug 252 is preferably used to prevent a spilled substance from flowing between the corners of the pans 110 or 210. For example, a plug 252 is configured for insertion between the four corners of adjacently located pans. Two inset views illustrated in FIGS. 16B and 16C provide a blowup or closeup view of the clips 120 and plug 252, respectively.

While the spill containment system has been proposed for containing acid spills from batteries, it can be used to contain spills from any device such as air conditioning units (which may leak water or freon), water heaters (which may leak water), or any other device. Moreover, it is not limited to containing and/or neutralizing acid spills as it can be used to contain and/or neutralize any kind of spill including an alkaline spill.

While embodiments and implementations of the subject invention have been shown and described, it should be apparent that many more embodiments and implementations are within the scope of the subject invention. Accordingly, the invention is not to be restricted, except in light of the claims and their equivalents.

I claim:

1. A battery spill containment system for containing a spilled substance from at least one battery in service as back-up power supply, the battery spill containment system comprising:
   a plurality of containment rails;
   a coupler adapted to couple the containment rails to one another to define a perimeter for housing the at least one battery, the coupler permitting at least one of the containment rails to be removable;
   a flexible liner placed in the perimeter formed by the plurality of containment rails to define a containment perimeter, the flexible liner being resistant to damage from the spilled substance; and
   a material for placement on the flexible liner within the containment perimeter, the material adapted to absorb and chemically neutralize the spilled substances,
   wherein at least one of the containment rails can be removed to access the at least one battery without damaging the containment perimeter.

2. The battery spill containment system of claim 1 wherein the containment rails are formed of a material that is resistant to damage from the spilled substance.

3. The battery spill containment system of claim 2 wherein the containment rails comprise fiberglass.

4. The battery spill containment system of claim 2 wherein the containment rails comprise polyvinylchloride.

5. The battery spill containment system of claim 2 wherein the containment rails comprise polypropylene.

6. The battery spill containment system of claim 2 wherein the containment rails comprise vinyl.

7. The battery spill containment system of claim 2 wherein the containment rails comprise a composite.

8. The battery spill containment system of claim 1 wherein the containment rails are coated with a material that is resistant to damage from the spilled substance.

9. The battery spill containment system of claim 8 wherein the containment rails are coated with polyvinylchloride.

10. The battery spill containment system of claim 8 wherein the containment rails are coated with epoxy.

11. The battery spill containment system of claim 1 wherein the flexible liner is coated with polyvinylchloride.

12. The battery spill containment system of claim 1 wherein the flexible liner comprises polyvinylchloride.

13. The battery spill containment system of claim 1 wherein the flexible liner comprises vinyl.

14. The battery spill containment system of claim 1 wherein the coupler is adapted to directly couple one of the containment rails to the another one of the containment rails.

15. The battery spill containment system of claim 14 wherein each of the containment rails has a plurality of ends and the coupler is adapted to couple one end of one of the containment rails to the end of another one of the containment rails.

16. The battery spill containment system of claim 15 wherein the coupler comprises a corner rail having a slot into which an end of one of the containment rails is adapted to engage.

17. The battery spill containment system of claim 14 wherein the plurality of containment rails are adapted to define a rectangle and the coupler comprises four corner couplers, one corner coupler for each corner of the rectangle.

18. The battery spill containment system of claim 14 wherein the coupler comprises a bolt, screw, nail, staple, or clip.

19. The battery spill containment system of claim 14 wherein the coupler comprises an adhesive.

20. The battery spill containment system of claim 14 further comprising a second coupler adapted to mount the flexible liner to at least one of the containment rails.

21. The battery spill containment system of claim 20 wherein the second coupler is adapted to mount a top edge of the flexible liner to a top edge of at least one of the containment rails.

22. The battery spill containment system of claim 20 wherein the second coupler comprises a bolt, screw, nail, staple, or clip.

23. The battery spill containment system of claim 20 wherein the second coupler comprises a hook.

24. The battery spill containment system of claim 20 wherein the second coupler comprises adhesive.

25. The battery spill containment system of claim 1 wherein the coupler is adapted to indirectly couple one of the containment rails to the another one of the containment rails.

26. The battery spill containment system of claim 25 wherein the coupler is adapted to mount the flexible liner to the containment rails in a manner that indirectly couples the containment rails to one another.

27. The battery spill containment system of claim 26 wherein the coupler comprises a bolt, screw, nail, staple, or clip.

28. The battery spill containment system of claim 26 wherein the coupler comprises an adhesive.

29. The battery spill containment system of claim 26 wherein the coupler comprises a hook.

30. The battery spill containment system of claim 1 wherein the coupler comprises a hook.

31. The battery spill containment system of claim 1 wherein the containment rails are adapted to adjustably form one of a plurality of dimensions.

32. The battery spill containment system of claim 31 wherein the containment rails have slots.

33. The battery spill containment system of claim 1 wherein the containment rails are invertible such that the exterior surfaces of the containment rails have fewer protruding structures.

34. The battery spill containment system of claim 1 wherein the containment rails comprise a metal.

35. The battery spill containment system of claim 34 wherein the containment rails are coated with a material that is resistant to damage from the spilled substance.

36. The battery spill containment system of claim 1 wherein the containment rails have a height less than the height of the liner.

37. The battery spill containment system of claim 36 wherein the flexible liner has a height of at least four inches.

38. The battery spill containment system of claim 1 wherein the height of the containment rails is substantially equal to the height of the flexible liner.

39. The battery spill containment system of claim 1 further comprising a protective member adapted to be placed between the battery and the material.

40. The battery spill containment system of claim 39 wherein the protective member includes a grid placed between the battery and the material.

41. The battery spill containment system of claim 39 wherein the battery is a valve regulated lead acid battery and the protective member includes a pad placed between the battery and the material.

42. The battery spill containment system of claim 1 wherein the flexible liner is semi-rigid.

43. The battery spill containment system of claim 1 further comprising a mount adapted to mount the battery spill containment system to a stanchion.

44. A battery rack system comprising a vertical stanchion and a plurality of battery spill containment system of claim 43 mounted to the vertical stanchion.

45. The battery rack system of claim 44 wherein each of the plurality of battery spill containment systems is mounted to the vertical stanchion at a different height relative to the other battery spill containment systems.

46. The battery spill containment system of claim 1 further comprising a spill detector that detects whether a spill has occurred.

47. The battery spill containment system of claim 46 wherein the spill detector indicates whether a spill has occurred.

48. The battery spill containment system of claim 46 wherein when the spill detector detects that a spill has occurred, the spill detector alerts a second device.

49. The battery spill containment system of claim 46 wherein the spill detector communicates with a second device when the spill detector detects that a spill has occurred such that the second device performs an act to remedy the spill.

50. The battery spill containment system of claim 46 wherein the spill detector includes:
   a permeable membrane through which the spilled substance may pass to contact a circuit; and
   a circuit monitor that monitors whether the spilled substance has passed through the permeable membrane.

51. A battery storage system comprising the spill containment system of claim 1 and a battery rack adjacent to the battery spill containment system and holding a battery.

52. A method for containing a spilled substance from a battery in service as a back-up power supply, the method comprising the steps of:
   coupling a plurality of containment rails to define a perimeter, the containment rails having walls;
   placing a flexible liner in the perimeter to define a containment perimeter, the flexible liner being resistant to damage from the spilled substance; and
   placing a material that is capable of absorbing and neutralizing the spilled substance in the containment perimeter.
   wherein the at least one containment rails is adapted to be removed without damaging the containment perimeter.

53. The method for containing a spilled substance of claim 52 further comprising the step of placing the flexible liner in the containment perimeter before the step of placing the material in the area of containment.

54. The method for containing a spilled substance of claim 52 further comprising removing a containment rail to gain access to a battery.

55. The method for containing a spilled substance of claim 54 further comprising flexing the flexible liner to gain access to a battery.

56. The method for containing a spilled substance of claim 55 further comprising replacing the removed containment rail.

57. The method for containing a spilled substance of claim 52 wherein the plurality of containment rails are resistant to damage from the spilled substance.

58. The method for containing a spilled substance of claim 57 wherein the plurality of containment rails comprise fiberglass or polyvinylchloride.

59. The method for containing a spilled substance of claim 57 wherein the plurality of containment rails was coated with a material that is resistant to damage from the spilled substance.

60. The method for containing a spilled substance of claim 59 wherein the plurality of containment rails comprise a metal.

61. The method for containing a spilled substance of claim 60 wherein the plurality of containment rails are coated with epoxy.

62. The method for containing a spilled substance of claim 60 wherein the plurality of containment rails are coated with polyvinylchloride.

63. The method for containing a spilled substance of claim 52 wherein the flexible liner is semi-rigid.

64. The method for containing a spilled substance of claim 52 wherein the flexible liner comprises polyvinylchloride.

65. The method for containing a spilled substance of claim 52 wherein the flexible liner comprises vinyl.

66. The method for containing a spilled substance of claim 52 further comprising adjusting the plurality of containment rails to form a perimeter of desired dimensions.

67. The method for containing a spilled substance of claim 52 further comprising placing a protective member on the material where the protective member protects the material from the battery.

68. The method for containing a spilled substance of claim 52 further comprising detecting whether a spill has occurred.

69. The method for containing a spilled substance of claim 68 further comprising indicating whether a spill has occurred.

70. A modular battery spill containment system for containing a spilled substance from a battery, the modular battery spill containment system comprising:
    a plurality of pans, each pan having a base and a plurality of vertical walls, the plurality of pans being resistant to damage from the spilled substance;
    a coupler adapted to couple one of the pans to another one of the pans to define an area for housing the battery; and
    a material adapted to be placed in the plurality of pans, the material adapted to absorb and chemically neutralize the spilled substance.

71. The modular battery spill containment system of claim 70 wherein the pans comprise fiberglass.

72. The modular battery spill containment system of claim 70 wherein the pans comprise polyvinylchloride.

73. The modular battery spill containment system of claim 70 wherein the pans comprise polypropylene.

74. The modular battery spill containment system of claim 70 wherein the pans comprise vinyl.

75. The modular battery spill containment system of claim 70 wherein the pans comprise a composite.

76. The modular battery spill containment system of claim 70 wherein the pans are coated with a material that is resistant to damage from the spilled substance.

77. The modular battery spill containment system of claim 76 wherein the pans are coated with polyvinylchloride.

78. The modular battery spill containment system of claim 76 wherein the pans are coated with epoxy.

79. The modular battery spill containment system of claim 76 wherein the pans comprise a metal.

80. The modular battery spill containment system of claim 70 further comprising a liner adapted for placement in one of the pans, the liner being resistant to damage from the spilled substance.

81. The modular battery spill containment system of claim 80 wherein the liner is flexible.

82. The modular battery spill containment system of claim 80 wherein the liner is semi-rigid.

83. The modular battery spill containment system of claim 70 wherein the coupler is integrally formed with the pan.

84. The modular battery spill containment system of claim 83 wherein the pans have at least two integrally formed couplers.

85. The modular battery spill containment system of claim 84 wherein the at least two integrally formed couplers are located on adjacent sides of the pan.

86. The modular battery spill containment system of claim 84 wherein the at least two integrally formed couplers are located on opposite sides of the pan.

87. The modular battery spill containment system of claim 83 wherein the integrally formed coupler comprises a clip or hook.

88. The modular battery spill containment system of claim 83 further comprising a liner adapted for placement in one of the pans, the liner being resistant to damage from the spilled substance, and a second coupler adapted to mount the liner to one of the pans.

89. The modular battery spill containment system of claim 88 wherein the second coupler is adapted to mount a top edge of the liner to a top edge of one of the pans.

90. The modular battery spill containment system of claim 88 wherein the second coupler comprises a bolt, screw, nail, staple, or clip.

91. The modular battery spill containment system of claim 88 wherein the second coupler comprises a hook.

92. The modular battery spill containment system of claim 88 wherein the second coupler comprises adhesive.

93. The modular battery spill containment system of claim 70 wherein the coupler is separate from the pans.

94. The modular battery spill containment system of claim 93 wherein the coupler comprises a clip or hook.

95. The modular battery spill containment system of claim 94 wherein the coupler comprises an elongate clip.

96. The modular battery spill containment system of claim 93 further comprising a liner adapted for placement in one of the pans, the liner being resistant to damage from the spilled substance, and a second coupler adapted to mount the liner to one of the pans.

97. The modular battery spill containment system of claim 96 wherein the second coupler is adapted to mount a top edge of the liner to a top edge of one of the pans.

98. The modular battery spill containment system of claim 96 wherein the second coupler comprises a bolt, screw, nail, staple, or clip.

99. The modular battery spill containment system of claim 96 wherein the second coupler comprises a hook.

100. The modular battery spill containment system of claim 96 wherein the second coupler comprises adhesive.

101. A battery spill containment system for containing a spilled substance from a battery in service as back-up power supply, the battery spill containment system comprising:
    a plurality of containment rails;
    a mount adapted to connect the plurality of containment rails to one another to define a perimeter for housing the battery;
    a flexible liner placed in the perimeter formed by the plurality of containment rails to define a containment perimeter, the flexible liner being resistant to damage from the spilled substance; and
    a material for placement on the flexible liner within the containment perimeter, the material adapted to absorb and chemically neutralize the spilled substance, wherein the mount permits at least one of the plurality of containment rails to be removed to access the battery without damaging the containment perimeter.

102. The battery spill containment system of claim 101 wherein the flexible liner includes at least one welded corner.

103. The battery spill containment system of claim 102 wherein the flexible liner includes at least one thermally welded corner.

104. The battery spill containment system of claim 102 wherein the flexible liner includes at least one dielectrically welded corner.

105. The battery spill containment system of claim 101 wherein the flexible liner includes a plurality of welded corners.

106. The battery spill containment system of claim 101 wherein the flexible liner includes at least one welded seam.

107. The battery spill containment system of claim 106 wherein the flexible liner includes at least one thermally welded seam.

108. The battery spill containment system of claim 106 wherein the flexible liner includes at least one dielectrically welded seam.

109. The battery spill containment system of claim 101 wherein the plurality of containment rails are formed of a material that is resistant to damage from the spilled substance.

110. The battery spill containment system of claim 109 wherein the plurality of containment rails comprise fiberglass.

111. The battery spill containment system of claim 109 wherein the plurality of containment rails comprise polyvinylchloride.

112. The battery spill containment system of claim 109 wherein the plurality of containment rails comprise polypropylene.

113. The battery spill containment system of claim 109 wherein the plurality of containment rails comprise vinyl.

114. The battery spill containment system of claim 109 wherein the plurality of containment rails comprise a composite.

115. The battery spill containment system of claim 101 wherein the plurality of containment rails are coated with a material that is resistant to damage from the spilled substance.

116. The battery spill containment system of claim 115 wherein the plurality of containment rails are coated with polyvinylchloride.

117. The battery spill containment system of claim 115 wherein the plurality of containment rails are coated with epoxy.

118. The battery spill containment system of claim 101 wherein the flexible liner is coated with polyvinylchloride.

119. The battery spill containment system of claim 101 wherein the flexible liner comprises polyvinylchloride.

120. The battery spill containment system of claim 101 wherein the flexible liner comprises vinyl.

121. The battery spill containment system of claim 101 wherein the mount is adapted to directly connect one of the plurality of containment rails to another one of the plurality of containment rails.

122. The battery spill containment system of claim 121 wherein each of the plurality of containment rails has a plurality of ends and the mount is adapted to connect one end of one of the plurality of containment rails to the end of another one of the plurality of containment rails.

123. The battery spill containment system of claim 122 wherein the mount comprises a corner rail having a slot into which an end of one of the plurality of containment rails is adapted to engage.

124. The battery spill containment system of claim 121 wherein the plurality of containment rails are adapted to define a rectangle and the mount comprises four corner couplers, one corner coupler for each corner of the rectangle.

125. The battery spill containment system of claim 121 wherein the mount comprises a bolt, screw, nail, staple, or clip.

126. The battery spill containment system of claim 121 wherein the mount comprises an adhesive.

127. The battery spill containment system of claim 101 further comprising a second mount adapted to mount the one of the plurality of containment rails to the floor without an adhesive.

128. The battery spill containment system of claim 127 wherein the second mount comprises a bolt, screw, or clip.

129. The battery spill containment system of claim 101 wherein the mount is adapted to simultaneously mount two of the plurality of containment rails to each other and to the floor.

130. The battery spill containment system of claim 101 wherein the mount is adapted to indirectly connect one of the plurality of containment rails to the another one of the plurality of containment rails.

131. The battery spill containment system of claim 101 wherein the plurality of containment rails are coated with a material that is resistant to damage from the spilled substance.

132. The battery spill containment system of claim 101 wherein the plurality of containment rails have a height less than the height of the liner.

133. The battery spill containment system of claim 132 wherein the flexible liner has a height of at least four inches.

134. The battery spill containment system of claim 101 wherein the height of the plurality of containment rails is substantially equal to the height of the flexible liner.

* * * * *

UNITED STATES PATENT AND TRADEMARK OFFICE
CERTIFICATE OF CORRECTION

PATENT NO. : 6,901,946 B2
DATED : June 7, 2005
INVENTOR(S) : Douglas Frazier

It is certified that error appears in the above-identified patent and that said Letters Patent is hereby corrected as shown below:

Title page,
Item [*] Notice, insert the following:
-- This patent is subject to a terminal disclaimer. --.
Item [56], References Cited, OTHER PUBLICATIONS, please add:
-- American Lining Corporation, "Drop in bag type flexible liners for tanks, trenches, pits, floors, vats, secondary containment, and corrosion control", printed 2/18/03, 3 pages. --.

Signed and Sealed this

Eighteenth Day of October, 2005

JON W. DUDAS
*Director of the United States Patent and Trademark Office*